(12) United States Patent
Enari

(10) Patent No.: US 6,504,930 B2
(45) Date of Patent: *Jan. 7, 2003

(54) ENCRYPTION AND DECRYPTION METHOD AND APPARATUS USING A WORK KEY WHICH IS GENERATED BY EXECUTING A DECRYPTION ALGORITHM

(75) Inventor: Masahiko Enari, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,286

(22) Filed: Feb. 25, 1997

(65) Prior Publication Data

US 2001/0010722 A1 Aug. 2, 2001

(30) Foreign Application Priority Data

Feb. 23, 1996 (JP) .............................. 8-060328

(51) Int. Cl.⁷ ............................................... H04L 9/06
(52) U.S. Cl. ............................ 380/37; 380/29; 380/44
(58) Field of Search ............................ 380/29, 37, 44, 380/43, 49

(56) References Cited

U.S. PATENT DOCUMENTS

| | | | |
|---|---|---|---|
| 4,203,166 A | * 5/1980 | Ehrsam et al. ............... | 375/2 |
| 4,776,011 A | * 10/1988 | Busby .......................... | 380/37 |
| 4,802,217 A | * 1/1989 | Michener ...................... | 280/29 |
| 4,982,429 A | 1/1991 | Takaragi et al. ............... | 380/28 |
| 5,081,676 A | * 1/1992 | Chou et al. ..................... | 380/4 |
| 5,103,479 A | 4/1992 | Takaragi et al. ............... | 380/28 |
| 5,222,139 A | * 6/1993 | Takaragi et al. ............... | 380/28 |
| 5,323,464 A | * 6/1994 | Elander et al. ................ | 380/24 |
| 5,602,918 A | * 2/1997 | Chen et al. ..................... | 380/21 |
| 5,613,012 A | * 3/1997 | Hoffman et al. ............. | 382/115 |
| 5,633,930 A | * 5/1997 | Davis et al. ................... | 380/24 |
| 5,784,683 A | * 7/1998 | Sistanizadeh et al. ......... | 455/5.1 |
| 5,870,473 A | * 2/1999 | Boesch et al. ................ | 380/21 |

FOREIGN PATENT DOCUMENTS

| | | |
|---|---|---|
| EP | 0 471 373 A2 | 2/1992 |
| EP | 0 583 140 A1 | 2/1994 |
| EP | 0 715 242 A1 | 6/1996 |
| JP | 1-276189 | 11/1989 |

OTHER PUBLICATIONS

Schneier, Bruce, Applied Cryptography, 1996, p. 277.*
Schneier, Bruce, Applied Cryptography, John Wiley and Sons, Inc., pp. 157–160, 1994.*

* cited by examiner

Primary Examiner—Gilberto Barrón
Assistant Examiner—Douglas J. Meislahn
(74) Attorney, Agent, or Firm—Frommer Lawrence & Haug LLP; William S. Frommer; Glenn F. Savit

(57) ABSTRACT

In a scrambler used in the transmission side, a decryptor for generating a work key from a data key and system keys uses the same decryption algorithm as that used in a decryptor for encryption in the OFB mode. Under this condition, in a descrambler used in the receiving side, a decryptor for generating a work key from a data key and system keys can use the same decryption algorithm as that used in a decryptor for encryption in the OFB mode. In addition, another decryptor can use the same decryption algorithm. Therefore, one decryptor can serve as these three decryptors. The scale of the descrambler configuration can be reduced.

24 Claims, 15 Drawing Sheets

ADD : 32-BIT ADDER
ROT n( ): CYCLIC, LEFT, n-BIT SHIFT
⊕ : LOGICAL EXCLUSIVE OR FOR EACH BIT

[ENCRYPTION]

INITIAL VALUE $C(0) = IV$
$C(i) = EKs(M(i), EOR.C(i-1))$

[DECRYPTION]

$M(i) = DKs(C(i), EOR.C(i-1))$

[ENCRYPTION]    [DECRYPTION]

Ks : DATA KEY
M(i): i-TH PLAIN TEXT BLOCK
C(i): i-TH CIPHER TEXT BLOCK
IV : SCRAMBLING INITIAL VALUE
Ek(m): ENCRYPTING m WITH k
Dk(c): DECRYPTING c WITH k

ENCRYPTION AND DECRYPTION METHOD AND APPARATUS USING A WORK KEY WHICH IS GENERATED BY EXECUTING A DECRYPTION ALGORITHM

BACKGROUND OF THE INVENTION

1. Field of the Invention

The present invention relates to an encryption method and encryption apparatus for encrypting a plain text, and a decryption method and decryption apparatus for decrypting a cipher text.

2. Description of the Related Art

It is conventionally known that information is encrypted in order to secure privacy for the information when communicating and recording. Information is encrypted into meaningless information and transferred or recorded in a recording medium. When the encrypted information is received, it is decrypted to get the original information.

There are two main encryption/decryption methods: a private key cryptosystem and a public key cryptosystem. In the private key cryptosystem, the same key is used for encryption and decryption. The encryption side and the decryption side have the same key in private. On the other hand, the public key cryptosystem uses different keys at the encryption side and the decryption side. The key used at the encryption side is open to the public whereas the key used at the decryption side is kept in private.

Known as a private key cryptosystem is the encryption/decryption algorithm specified in a Data Encryption Standard (DES), which is a standard encryption/decryption method in the United States. In the DES system, the encryption/decryption algorithm is open to the public and the ciphering strength is maintained just by a ciphering key. The reason why the encryption/decryption algorithm is made public is that it is expected that a vast amount of calculation is required for decryption without the ciphering key even when the algorithm is known and the calculation will need more than some hundred or thousand years with the use of a high-speed calculation unit.

Encryption is basically performed by a combination of transposition, which changes the sequence of characters, and substitution, which replaces a character with another character according to a specified rule. An encryption/decryption algorithm and a ciphering key indicate how the sequence of characters are changed and which character is replaced with which character.

Various encryption/decryption systems superior in security and speed have been developed in addition to the DES system. For example, an encryption/decryption system (MULTI 2 system) disclosed in the U.S. Pat. No. 4,982,429 and No. 5,103,479 and the Japanese Unexamined Patent Publication No. 1-276189 is known.

The International Standardization Organization (ISO) also specifies an encryption system in ISO 9979/0009 and an encryption-use mode in ISO/IEC 10116.

In the MULTI 2 encryption system, an input data is 64 bits long and an output data is also 64 bits long. A 256-bit work key used for encryption is generated by a 256-bit system key and a 64-bit data key. The number of encryption stages is a positive integer.

FIG. 12 shows an outlined configuration of the encryption algorithm in the MULTI 2 system. As shown in FIG. 12, a 256-bit work key Kw is generated in the encryption algorithm with the use of a 64-bit data key Ks and a 256-bit system key J. This operation is called a key schedule processing and is conducted by an encryption-algorithm executing means C. The generated work key Kw is supplied to an encryption-algorithm executing means F to encrypt an input 64-bit-blocked plain text. The same encryption algorithm can be conducted by the encryption-algorithm executing means C and the encryption-algorithm executing means F.

The basic encryption algorithm of the MULTI 2 system has been described above. The original plain text may be found by calculating the distribution of frequencies of characters or words that appear in statistical processing in advance and by computing a matching condition of the frequency distribution and that of character-string patterns in the obtained ciphered text.

There is a mode of operation in which a cipher text is generated by calculating logical exclusive OR between a 64-bit encrypted block and a 64-bit data block to be input next. This encryption mode is called a cipher block chaining (CBC) mode. The encryption-algorithm executing means F performs a CBC-mode encryption/decryption algorithm.

In a communication system in which a data unit used for communication is determined in advance, such as a packet communication, when a block encryption system employing a block having 64 bits is used and a data unit which cannot be divided by the number of bits in one block is input, there appears a fractional data having less than the number of bits in one block. This fractional data is handled in an output feedback (OFB) mode.

Fractional data, if any, is supplied to an encryption-algorithm executing means G and encrypted with the use of random numbers generated by using the work key Kw in the OFB mode. With this configuration, when one block has 64 bits, data having less than one block's worth of bits is encrypted and a cipher text is obtained. The CBC mode and OFB mode are called encryption-use modes.

FIG. 13 shows an outlined configuration of the decryption algorithm in the MULTI 2 system. As shown in FIG. 13, a 256-bit work key Kw is generated in an encryption algorithm with the use of a 64-bit data key Ks and a 256-bit system key J. The work-key generation is performed in a key schedule processing in which the same encryption algorithm as that used in the encryption side is used. The encryption algorithm is conducted by an encryption-algorithm executing means c. The generated work key Kw is supplied to a decryption-algorithm executing means f to decrypt an input 64-bit cipher text.

In this decryption algorithm, transposition and substitution in the encryption algorithm performed in the encryption-algorithm executing means F is conducted in the reverse order.

Cipher text encrypted in the OFB mode is supplied to an encryption-algorithm executing means g and decrypted with the use of random numbers generated by using the work key Kw. With this configuration, a 64-bit one-block cipher text is decrypted and the original 64-bit one-block plain text is obtained. The decryption-algorithm executing means f performs a CBC-mode decryption algorithm.

Encryption-use modes will be described below by referring to FIGS. 14A and 14B. FIG. 14A shows an outlined configuration of encryption and decryption in the CBC mode and FIG. 14B illustrates an outlined configuration of encryption and decryption in the OFB mode.

In the CBC mode, as shown in FIG. 14A, the i-th plain-text block M(i) is input to a logical exclusive OR circuit 101 and is exclusive-ORed with the one-block-before cipher-text block C(i−1) which is delayed and fed back by a register (REG) 103. The exclusive ORed data is encrypted by an encryption-algorithm executing means 102 with the use of the work key generated according to the data key Ks. The encrypted i-th cipher block C(i) is expressed as follows:

$$C(i)=EKs(M(i).EOR.\ C(i-1))$$

where EKs(m) indicates that m is encrypted with Ks and EOR indicates logical exclusive OR operation.

The cipher-text block C(i) is transmitted and received by the receiving side. The received cipher-text block C(i) is decrypted by a decryption-algorithm executing means 111 with the use of the work key generated according to the data key Ks, and is supplied to a logical exclusive OR circuit 113. The one-block-before cipher-text block C(i−1) which is delayed by a register (REG) 112 is input to the logical exclusive OR circuit 113 and logical exclusive OR between the two inputs is calculated. In this case, the same data key Ks is used both in the transmitting side and receiving side. The i-th plain-text block M(i) is obtained from the logical exclusive OR circuit 113. The i-th plain-text block M(i) is expressed as follows:

$$M(i)=DKs(C(i).EOR.C(i-1))$$

where DKs(c) indicates that c is decrypted with Ks.

In the OFB mode, the i-th plain-text block M(i) is input to a logical exclusive OR circuit 105. The output of an encryption-algorithm executing means 104, which is converted to random numbers with the use of the work key generated according to the data key Ks, is also input to the logical exclusive OR circuit 105. The output of the encryption-algorithm executing means 104 is delayed one block by a register 103 and fed back to the encryption-algorithm executing means 104. A cipher-text block C(i) encrypted with the use of random numbers is output from the logical exclusive OR circuit 105.

The cipher-text block C(i) is transmitted and received by the receiving side. The received cipher-text block C(i) is supplied to a logical exclusive OR circuit 114. The output of an encryption-algorithm executing means 115, which is converted to random numbers with the use of the work key generated according to the data key Ks, is also supplied. The output of the encryption-algorithm executing means 115 is delayed one block by a register (REG) 112 and fed back to the encryption-algorithm executing means 115. In this case, the random numbers supplied to the logical exclusive OR circuit 114 is the same as the random numbers supplied to the logical exclusive OR circuit 105. The decrypted i-th plain-text block M(i) is obtained from the logical exclusive OR circuit 114.

FIG. 15 shows an outlined configuration of an encryption/decryption system having the encryption-use modes described above. In FIG. 15, the transmitting side is provided with a scrambler 100 for encrypting data. Input data is scrambled, namely encrypted, by the scrambler 100 and transmitted. The scrambled transmission data is transferred via a transfer path such as in free space and received by the receiving side. The receiving side is provided with a descrambler 110. The scrambled transmission data is descrambled, namely decrypted, by the descrambler 110 to obtain the original data and is output.

The scrambler 100 has a CBC-mode encryption section including an encryptor 102 serving as an encryption-algorithm executing means for encrypting an input data (plain text), a register 103, and a logical exclusive OR (EX-OR) circuit 101, and an OFB-mode encryption section including an encryptor 104 serving as an encryption-algorithm executing means and a logical exclusive OR (EX-OR) circuit 105. The scrambler 100 is also provided with an encryptor 106 for generating a work key from a data key and a system key. The generated work key is supplied to the encryptors 102 and 104.

Since the encryptors 102, 104, and 106 can use the same encryption algorithm, one encryptor can be substituted for three encryptors. Since the operations of the CBC-mode and OFB-mode encryption sections have already been described, the descriptions thereof are omitted.

The descrambler 110 has a CBC-mode decryption section including a decryptor 111 serving as a decryption-algorithm executing means for decrypting an input, received data (cipher text), a register 112, and a logical exclusive OR (EX-OR) circuit 113, and an OFB-mode decryption section including an encryptor 115 serving as an encryption-algorithm executing means and a logical exclusive OR (EX-OR) circuit 114. The descrambler 110 is also provided with an encryptor 116 for generating a work key from a data key and a system key. The generated work key is supplied to the decryptor 111 and the encryptor 115.

Since the encryptors 115 and 116 can use the same encryption algorithm, one encryptor can be substituted for two encryptors. Since the operations of the CBC-mode and OFB-mode decryption sections have already been described, the descriptions thereof are omitted.

In the encryption/decryption system shown in FIG. 15, while the encryption side just executes the encryption algorithm, the decryption side has to execute the decryption algorithm and the encryption algorithm for generating the work key required for decryption. In other words, the decryption side needs to be provided with hardware sections for executing the decryption algorithm and encryption algorithm. Therefore, the decryption side has to have a larger-scale hardware section than the encryption side.

When the encryption/decryption system is used for a broadcasting system such as a satellite broadcasting system, the cost of receiving facilities increases compared with transmission facilities. Then, a broadcasting system is prevented from wide-spreading.

SUMMARY OF THE INVENTION

Accordingly, it is an object of the present invention to provide an encryption/decryption system and encryption/decryption apparatus in which a cipher text encrypted with a specified encryption algorithm is decrypted by the receiving side having simple configuration.

The foregoing object is achieved in one aspect of the present invention through the provision of an encryption method including a work-key generation step for generating a work key by executing a decryption algorithm and an encryption step for generating a cipher text by encrypting a plain text according to the specified encryption algorithm with the use of the work key generated in the work-key generation step.

The foregoing object is achieved in another aspect of the present invention through the provision of a decryption method including a work-key generation step for generating the work key used for encryption by executing a decryption algorithm and a decryption step for obtaining the original plain text by decrypting a cipher text according to the decryption algorithm with the use of the work key generated in the work-key generation step.

The foregoing object is achieved in yet another aspect of the present invention through the provision of an encryption/ decryption method including an encryption work-key generation step for generating a work key by executing a decryption algorithm, the step being implemented in the encryption side; an encryption step for generating a cipher text by encrypting a plain text according to the specified encryption algorithm with the use of the work key generated in the work-key generation step, the step being implemented in the encryption side; a decryption work-key generation step for generating the work key used for encryption by executing the decryption algorithm, the step being implemented in the decryption side; and a decryption step for obtaining the plain text by decrypting the cipher text according to the decryption algorithm with the use of the work key generated in the work-key generation step, the step being implemented in the decryption side.

The foregoing object is achieved in still another aspect of the present invention through the provision of an encryption apparatus including key schedule means for generating a work key by executing a decryption algorithm with the use of key information and encryption means for generating a cipher text by encrypting a plain text according to the specified encryption algorithm with the use of the work key generated by said key-schedule means.

The foregoing object is achieved in a further aspect of the present invention through the provision of a decryption apparatus including key schedule means for generating the work key used for encryption by executing a decryption algorithm and decryption means for obtaining the original plain text by decrypting a cipher text according to the decryption algorithm with the use of the work key generated by the key schedule means.

The foregoing object is achieved in a yet further aspect of the present invention through the provision of an encryption/decryption apparatus including the encryption side provided with encryption key-schedule means for generating a work key by executing a decryption algorithm, and encryption means for generating a cipher text by encrypting a plain text according to the specified encryption algorithm with the use of the work key generated by the encryption key-schedule means; and the decryption side provided with decryption key-schedule means for generating the work key used by the encryption means, by executing the decryption algorithm, and decryption means for obtaining the plain text by decrypting the cipher text according to the decryption algorithm with the use of the work key generated by the decryption key-schedule means.

According to an encryption method and a decryption method of the present invention, the work key required for decryption can be generated by executing the decryption algorithm. Therefore, means for executing the decryption algorithm which generates the work key and means for executing the decryption algorithm which decrypts a cipher-text can be implemented by one unit, and the configuration of the decryption side can be simplified.

In addition, when a plain text is encrypted with the use of random numbers generated by executing a decryption algorithm in the OFB mode, since the text encrypted in the OFB mode can be decrypted with the use of random numbers generated by executing the decryption algorithm, the unit described above can also serve as means for executing the decryption algorithm for generating random numbers in the OFB mode. Therefore, the configuration of the decryption side can be further simplified.

When the present invention is applied to a broadcasting system, the cost of the system can be reduced by simplifying the configuration of receiving facilities. Wide spread of the broadcasting system is promoted.

DESCRIPTION OF THE PREFERRED EMBODIMENT

Figure 1:
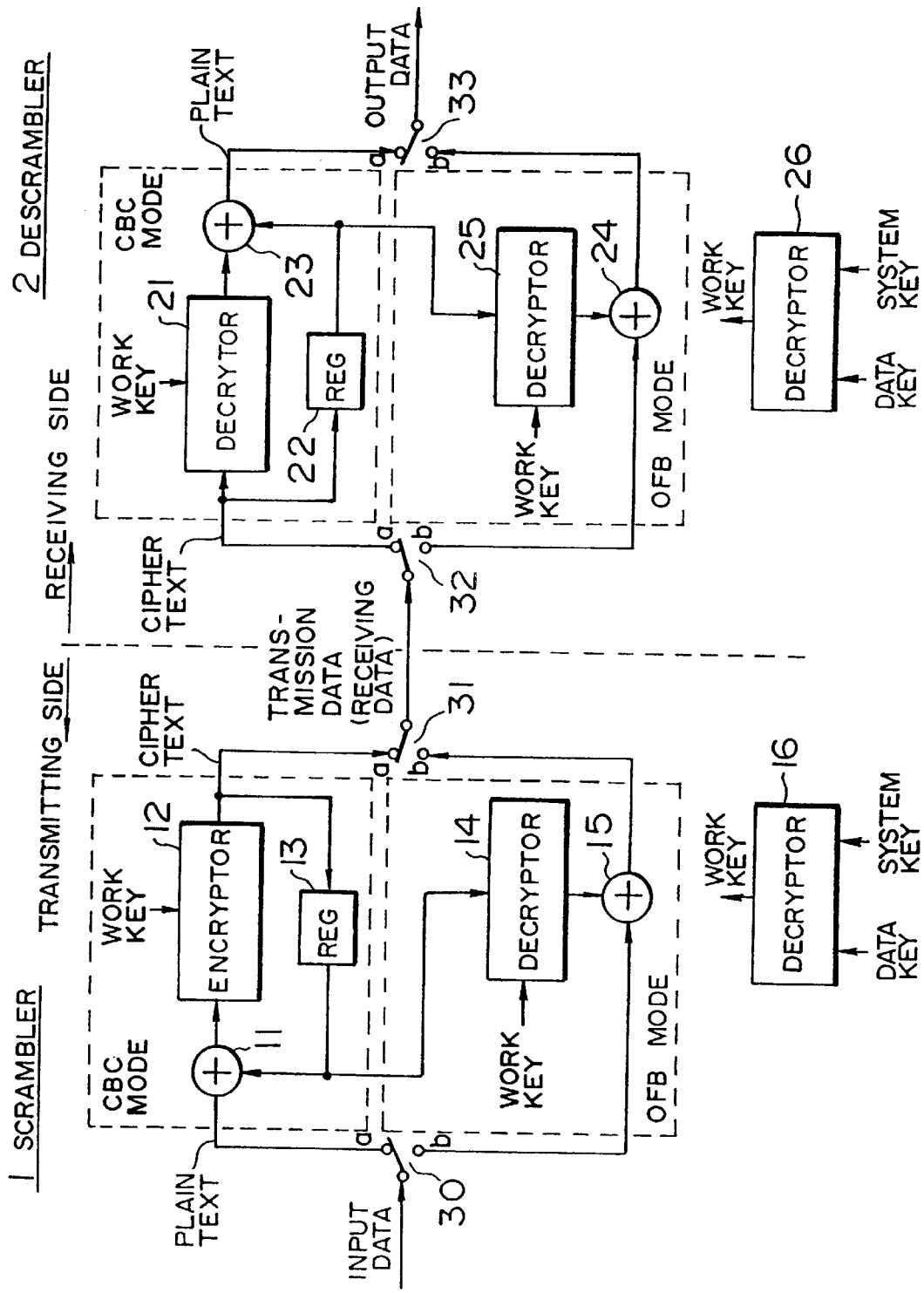
FIG. 1 is a block diagram showing an encryption apparatus and a decryption apparatus using an encryption method and a decryption method according to an embodiment of the present invention.

FIG. 1 is a block diagram showing an outlined configuration of an encryption/decryption apparatus which uses an encryption/decryption method including encryption-use modes, according to an embodiment of the present invention. The encryption method of the present invention is implemented in the transmitting side and the decryption method of the present invention is implemented in the receiving side.

In FIG. 1, the transmitting side is provided with a scrambler 1. Input data is scrambled, namely encrypted, by the scrambler 1 and transmitted. The scrambled transmission data is transferred via a transfer path such as free space and received by the receiving side. The receiving side is provided with a descrambler 2. The scrambled transmission data is descrambled, namely decrypted, by the descrambler 2 to obtain the original data.

The format of transmission data (receiving data) is, for example, a transport stream (TS) specified in ISO/IEC 13818. The transport stream has a 188-byte packet configuration, each packet usually including a four-byte header followed by a 184-byte payload. A dummy period for adding a 16-byte parity is attached to a packet in order to correct a transfer error. This type of a packet appears repeatedly to form a transport stream.

The header of a transport stream includes packet attribute information such as packet identification (PID) information indicating the packet contents, video data, audio data, or other data string, and transport scrambling control (TSC) information indicating whether data is encrypted or not. When it is determined from the result of checking the header of a packet that the received data is not encrypted, the transport stream is output as is from the descrambler 2 after it passes through a delay section. The delay time specified by the delay section is equal to the time required for descrambling in the descrambler 2.

The scrambler 1 has a CBC-mode encryption section including an encryptor 12 serving as an encryption-algorithm executing means for encrypting an input plain text, a register (reg) 13 for delaying one block the output of the encryptor 12, and a logical exclusive OR (EX-OR) circuit 11, and an OFB-mode encryption section including a decryptor 14 serving as a decryption-algorithm executing means and a logical exclusive OR (EX-OR) circuit 15. The scrambler 1 is also provided with a decryptor 16 serving as a decryption-algorithm executing means for generating a work key from a data key and a system key. The generated work key is supplied to the encryptor 12 and the decryptor 14.

The operation of the scrambler 1 will be described below. In the CBC mode, both a switching means 30 and a switching means 31 are switched to terminals "a", and input block data (plain text) is applied to the logical exclusive OR (EX-OR) circuit 11. It is exclusive-ORed with the output of the register 13 for delaying one block the output of the encryptor 12. The calculated output of EX-OR 11 is input to the encryptor 12 serving as an encryption-algorithm executing means. The encryptor 12 encrypts a plain text by executing the encryption algorithm with the use of a work key. The encrypted text is transmitted through the switching means 31.

Input data which has been made fractional when blocked is encrypted in the OFB mode. Both switching means 30 and 31 are switched to terminals "b" in the OFB mode, and input block data (plain text) is applied to the logical exclusive OR (EX-OR) circuit 15. It is exclusive-ORed with the random-number output of the decryptor 14 and encrypted. In this case, the decryptor 14 executes the decryption algorithm with the use of a work key and outputs random numbers. The encrypted text is transferred through the switching means 31.

The work key supplied to the encryptor 12 and the decryptor 14 is generated before encryption by executing the decryption algorithm in the decryptor 16 with the use of a data key and a system key.

Since the decryptors 14 and 16 are not used at the same time in encryption and they can use the same decryption algorithm, one encryptor can serve as both decryptors 14 and 16.

The descrambler 2 provided for the receiving side has a CBC-mode decryption section including a decryptor 21 serving as a decryption-algorithm executing means for decrypting input, received data (cipher text), a register 22 for delaying one block the input, received data, and a logical exclusive OR (EX-OR) circuit 23, and an OFB-mode decryption section including a decryptor 25 serving as a decryption-algorithm executing means and a logical exclusive OR (EX-OR) circuit 24. The descrambler 2 is also provided with a decryptor 26 for generating a work key from a data key and a system key. The generated work key is sent to the decryptor 21 and the decryptor 25.

The operation of the descrambler 2 will be described below. When the received data has been encrypted in the CBC mode, both a switching means 32 and a switching means 33 are switched to terminals "a", and input block data (cipher text) is applied to the decryptor 21. The same work key as that used for encryption, which is generated by the decryptor 26, is supplied to the decryptor 21. A cipher text is decrypted by executing the decryption algorithm with the use of this work key. The decrypted block data is input to the logical exclusive OR (EX-OR) circuit 23. It is exclusive-ORed with the received cipher text which is delayed one block by the register (reg) 22. The calculated result is decrypted to obtain the original plain text and the text is output through the switching means 33.

When a cipher text which has been made fractional and encrypted in the OFB mode is decrypted in the OFB mode, both switching means 32 and 33 are switched to terminals "b" and the received block data (cipher text) is input to the logical exclusive OR (EX-OR) circuit 24. It is exclusive-ORed with the random-number output of the decryptor 25 and decrypted. In this case, the decryptor 25 executes the decryption algorithm with the use of the work key generated by the decryptor 26 and outputs the same random numbers as in the transmitting side. The decrypted plain text is transferred through the switching means 33.

The work key supplied to the decryptor 21 and the decryptor 25 is generated before decryption by executing the decryption algorithm in the decryptor 26 with the use of the same data key and the same system key as in the transmitting side.

It is required that the decryptor 14 and the decryptor 25 use the same decryption algorithm, and the decryptor 16 and the decryptor 26 use the same decryption algorithm in the scrambler 1 and the descrambler 2. When one decryptor serves as the decryptor 14 and the decryptor 16 in the scrambler 1, the decryptor 25 and the decryptor 26 use the same decryption algorithm.

In the scrambler 1, the decryption algorithm used in the decryptor 14 can be equal to a decryption algorithm for decrypting the encryption algorithm used in the encryptor 12. When the decryption algorithm is set as described above, the decryptor 21 and the decryptor 25 can use the same decryption algorithm in the descrambler 2. This means that the decryptors 21, 25, and 26 can use the same algorithm in the descrambler 2.

Since the decryptors 21, 25, and 26 are not used at the same time in decryption, one decryptor can serve as the decryptors 21, 25, and 26. The present invention features a common use of a decryptor as described above and substantially simplifies the configuration of the descrambler 2, that is, the configuration of a decryption means.

An encryption algorithm used in an encryption method of the present invention will be described below by referring to FIG. 2.

Figure 2:
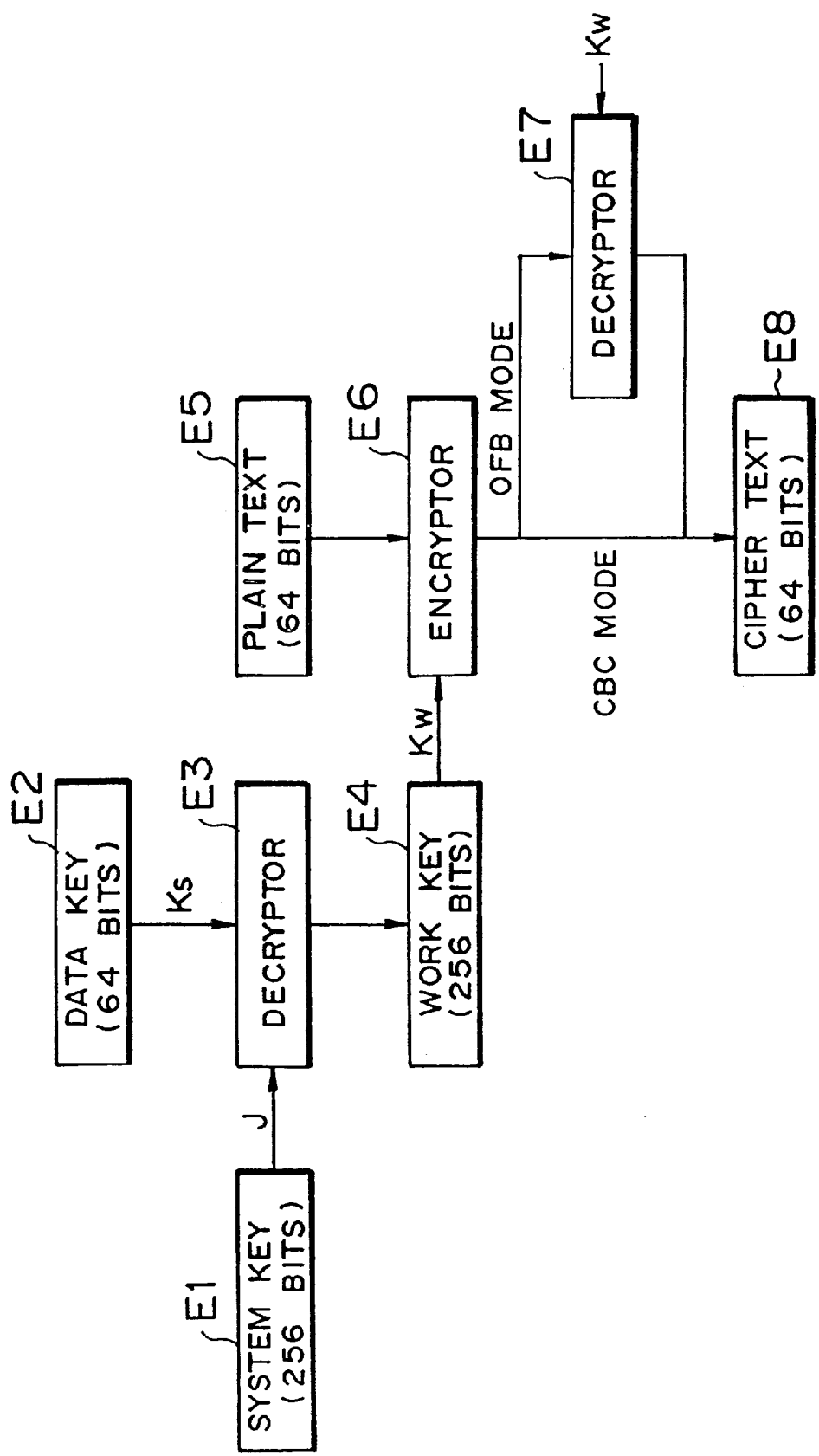
FIG. 2 is a block diagram showing an encryption algorithm used in an encryption method of the present invention.

In the encryption algorithm of the present invention shown in FIG. 2, input data is grouped to have 64 bits and output data is also grouped to have 64 bits. A 256-bit work key for encryption is generated from a 256-bit system key and a 64-bit data key. The number of encryption stages is a positive integer.

A 256-bit work key Kw is generated by executing a decryption algorithm with the use of a 64-bit data key Ks and a 256-bit system key J. This operation is called a key schedule processing and performed by a decryption-algorithm executing means E3. The generated work key Kw is supplied to an encryption-algorithm executing means E6 to encrypt an input 64-bit plain text. The decryption algorithm executed in the decryption-algorithm executing means E3 needs to be able to decrypt the encryption algorithm executed by the encryption-algorithm executing means E6.

The original plain text may be found by calculating the distribution of frequencies characters or words appear in statistical processing in advance and by computing a matching condition of the frequency distribution and that of character-string patterns in the obtained cipher text encrypted as described above. Therefore, the CBC mode is employed, in which a cipher text is generated by calculating logical exclusive OR between a 64-bit encrypted block and a 64-bit plain text data to be input next. The encryption-algorithm executing means E6 performs such a CBC-mode encryption algorithm.

In a system in which a data unit is determined in advance, when 64 bits, for example, are encrypted as one block and a data unit which cannot be divided by the number of bits in one block is input, there appears a fractional data having a less number of bits than one block. This fractional data is handled in the OFB mode.

A fractional data, if any, is supplied to a decryption-algorithm executing means E7, and encrypted with the use of random numbers generated by using the 256-bit work key Kw in the OFB mode. With this configuration, when 64 bits are encrypted as one block, data having a less number of bits than one block is encrypted and a cipher text is obtained. The CBC mode and OFB mode are called encryption use modes.

As described above, the decryption algorithm used in the decryption-algorithm executing means E3 which generates the work key Kw is the same as the decryption algorithm used in the decryption-algorithm executing means E7 serving as an OFB-mode encryption means. One decryption-algorithm executing means actually does these two operations.

Figure 4:
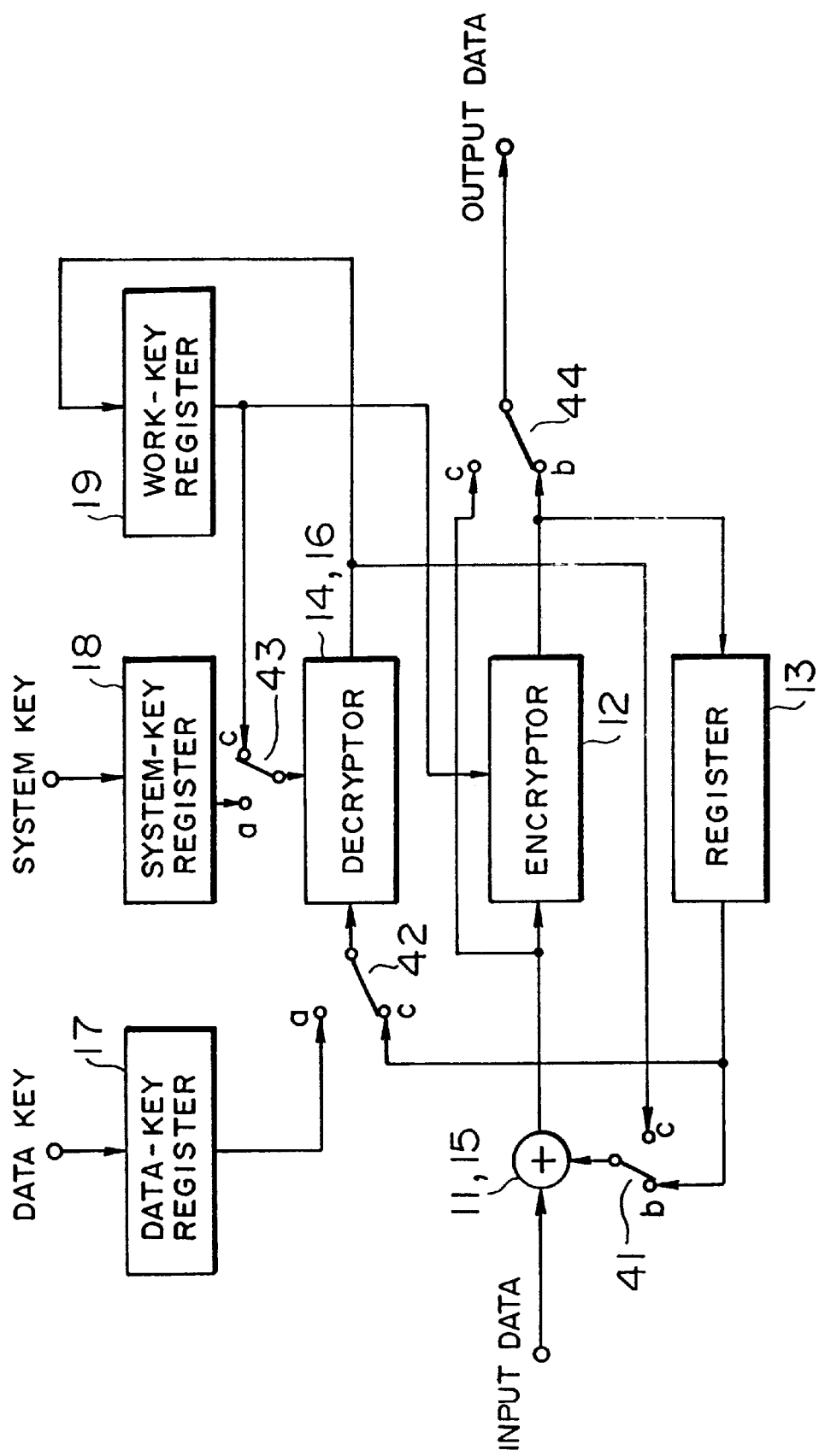
FIG. 4 is a block diagram showing a scrambler to which an encryption method of the present invention is applied.

FIG. 4 shows a configuration of a scrambler 1 in which one decryption-algorithm executing means does the two operations. In FIG. 4, a decryptor 14 (16) serves as the decryptors 14 and 16 shown in FIG. 1, and EX-OR 11 (15) acts as two EX-ORs shown in FIG. 1.

In FIG. 4, a 64-bit data key is written in advance into a data-key register 17 and a 256-bit system key for each system is written into a system-key register 18 prior to encryption processing. To increase cipher strength, the data key is updated every several seconds or every several tens of seconds.

In this condition, switching means 42 and 43 are both switched to terminals "a." The 64-bit data key stored in the data-key register 17 and the 256-bit system key stored in the system-key register 18 are supplied to the decryptor 14 (16). A 256-bit work key is generated by executing the decryption algorithm in the decryptor 14 (16). The work key is written into a work-key register 19.

When the work key is generated, switching means 41 and 44 are both switched to terminals "b." Blocked 64-bit input data is input to EX-OR 11 (15), and exclusive-ORed with cipher data delayed one block by a register 13. The calculation result is input to the encryptor 12 and encrypted by executing the encryption algorithm with the use of the work key read from the work-key register 19. The cipher text output from the encryptor 12 is a CBC-mode cipher text and output through the switching means 44. When initialization is performed at power on, the register 13 is set to an initial value.

When fractional data is input, the switching means 42 and 43 are both switched to terminals "c" and the switching means 41 and 44 are both also switched to terminals "c." The encrypted data delayed by the register 13 is input to the decryptor 14 (16) through the switching means 42, and converted to random numbers by executing the decryption algorithm with the use of the work key which is supplied to the decryptor 14 (16) from the work-key register 19. The random numbers generated by the decryptor 14 (16) are input to EX1-OR 11 (15) through the switching means 41 and exclusive ORed with the fractional input data for encryption. The cipher text encrypted in this way in the OFB mode is output through the switching means 44.

Figure 3:
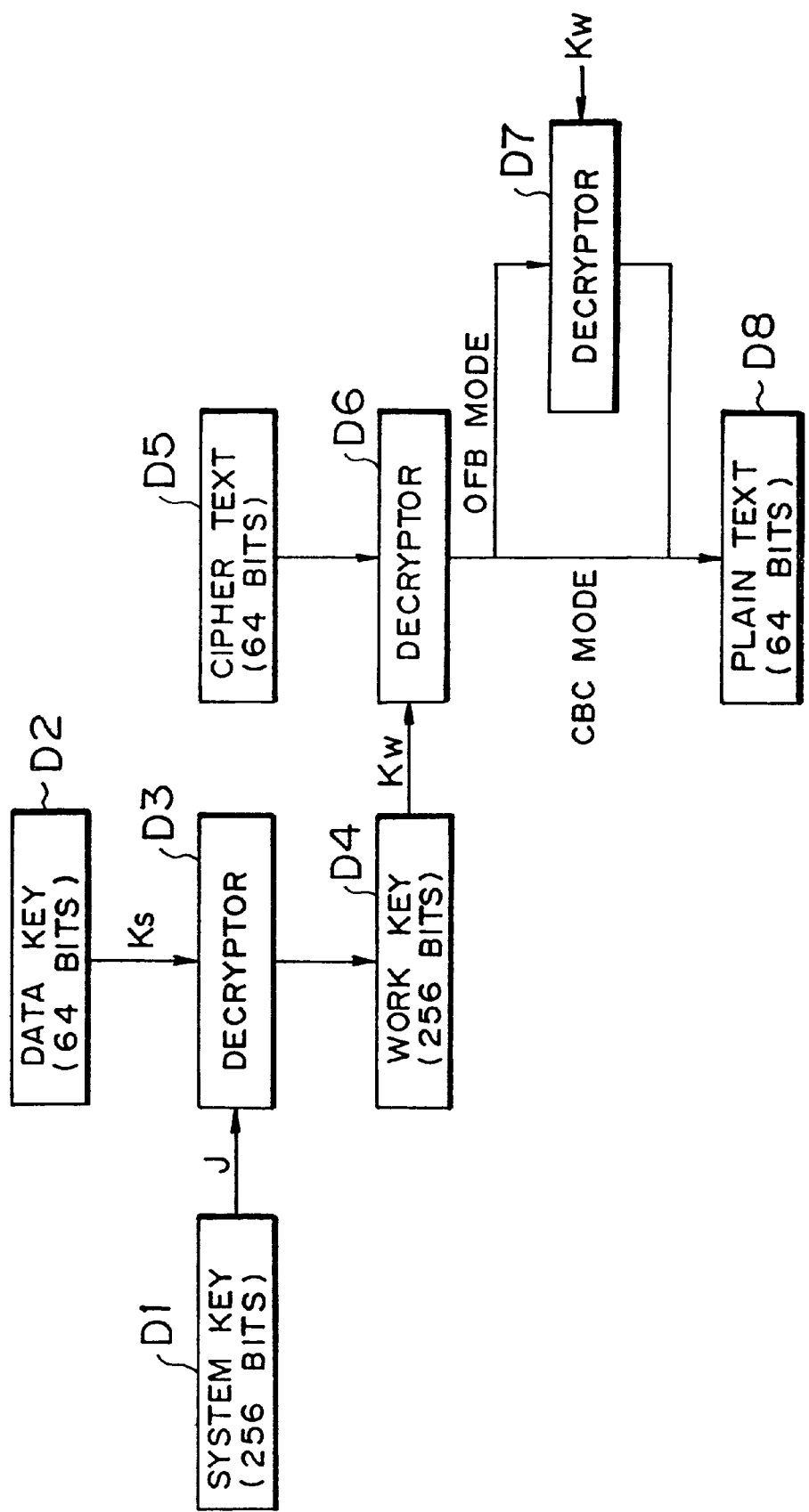
FIG. 3 is a block diagram showing a decryption algorithm used in a decryption method of the present invention.

A decryption algorithm used in a decryption method of the present invention will be described below by referring to FIG. 3. As shown in FIG. 3, a 256-bit work key Kw is generated by executing a decryption algorithm with the use of a 64-bit data key Ks and a 256-bit system key J. The work key is generated in the key schedule processing which uses the same decryption algorithm as in the encryption side. A decryption-algorithm executing means D3 performs the decryption algorithm. The generated work key Kw is supplied to a decryption-algorithm executing means D6 to decrypt an input, CBC-mode, 64-bit-blocked, cipher text.

In the decryption algorithm, transposition and substitution specified in the encryption algorithm executed in the encryption-algorithm executing means E6 shown in FIG. 2 are performed in the reverse order.

A cipher text encrypted in the OFB mode is supplied to a decryption-algorithm executing means D7 and decrypted with the use of random numbers generated by using the work key Kw. The decryption-algorithm executing means D7 performs the same decryption algorithm as that used in the decryption-algorithm executing means E7 shown in FIG. 2.

As described above, the decryption algorithm used in the decryption-algorithm executing means D3 which generates the work key Kw is the same as the decryption algorithm used in the decryption-algorithm executing means D7 serving as an OFB-mode encryption means, and it is also the same as the decryption algorithm used in the decryption-algorithm executing means D6 which decrypts a cipher text. In decryption, one decryption-algorithm executing means performs these three kinds of operations.

Figure 5:
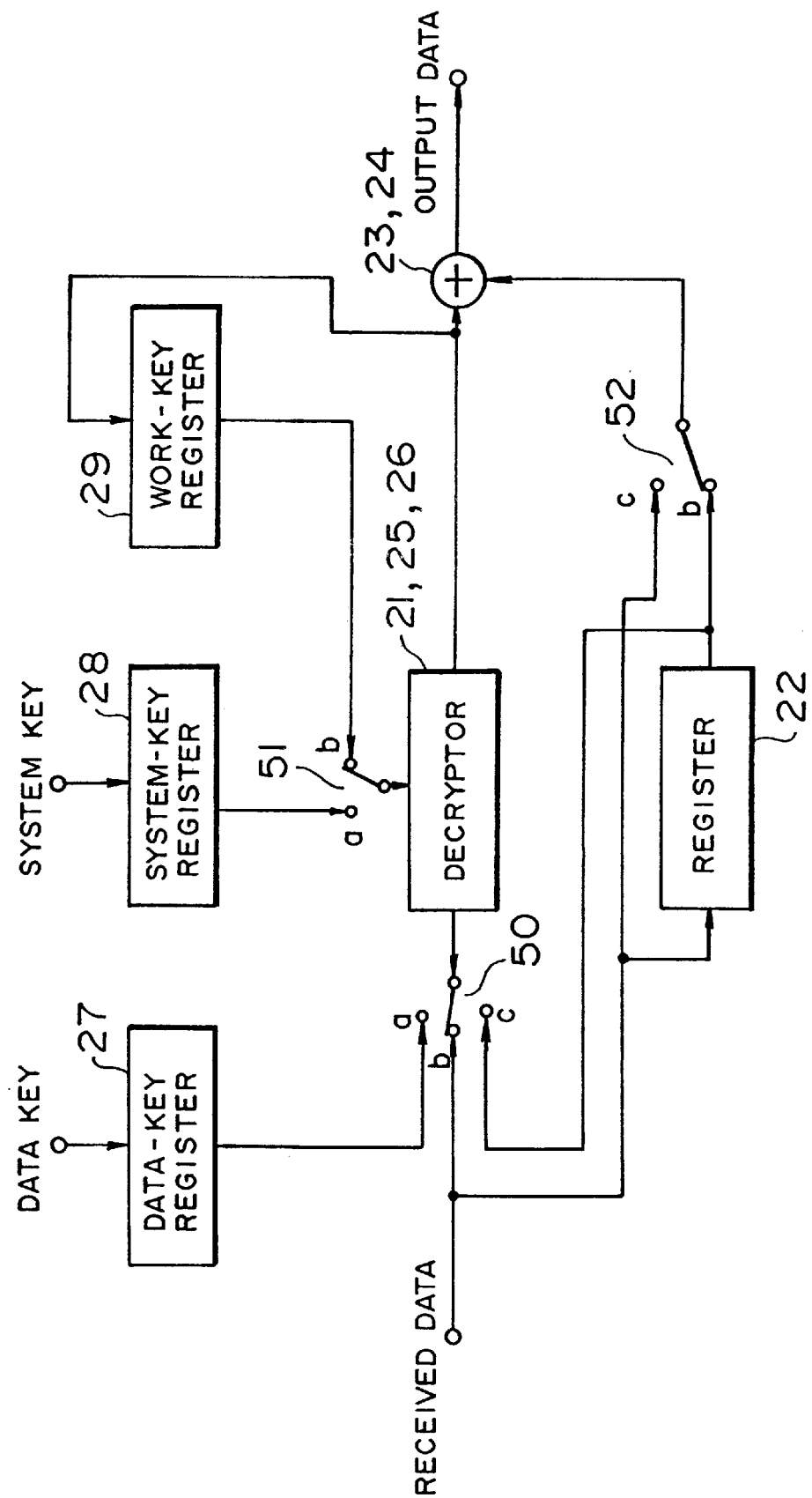
FIG. 5 is a block diagram showing a descrambler to which a decryption method of the present invention is applied.

FIG. 5 shows a configuration of a descrambler 2 in which one decryption-algorithm executing means performs the three kinds of operations. In FIG. 5, a decryptor 21 (25, 26) serves as the decryptors 21, 25, and 26 shown in FIG. 1, and EX-OR 23 (24) acts as two EX-ORs shown in FIG. 1.

In FIG. 5, a 64-bit data key is written in advance into a data-key register 27 and a 256-bit system key is written in advance into a system-key register 28.

In this condition, switching means 50 and 51 are both switched to terminals "a." The 64-bit data key stored in the data-key register 27 and the 256-bit system key stored in the system-key register 28 are supplied to the decryptor 21 (25, 26). A 256-bit work key is generated by executing the decryption algorithm in the decryptor 21 (25, 26). The work key is written into a work-key register 29.

When the work key is generated and stored in the work-key register 29, the switching means 50 and 51 and a switching means 52 are all switched to terminals "b" in the CBC mode. Received, 64-bit-blocked cipher data is input to the decryptor 21 (25, 26) through the switching means 50, and decrypted by executing the decryption algorithm in the decryptor 21 (25, 26) with the use of the work key read from the work-key register 29. The decrypted data is input to EX-OR 23 (24), and exclusive ORed with the received data delayed one block by a register 22 and input to EX-OR 23 (24) through the switching means 52. The cipher text encrypted in the OFB mode is decrypted to regenerate the original plain text.

When encrypted, fractional data is input, the switching means 50 and 52 are both switched to terminals "c." The received data delayed one block by the register 22 is input to the decryptor 21 (25, 26) through the switching means 50, and converted to random numbers by executing the decryption algorithm with the use of the work key which is supplied to the decryptor 21 (25, 26) from the work-key register 29. The random numbers generated by the decryptor 21 (25, 26) are input to EX-OR 23 (24) and exclusive ORed with the encrypted, fractional, received data input through the switching means 52. The cipher text encrypted in the OFB mode is decrypted to regenerate the plain text.

As described above, since one decryptor for executing the decryption algorithm serves as three decryptors in the descrambler 2, which is a decryption apparatus implementing a decryption method of the present invention, its configuration can be substantially simplified.

Details of the encryption algorithm executed by the encryptor and the decryption algorithm executed by the decryptors will be described below by referring to FIGS. 6 and 11.

Figure 6:
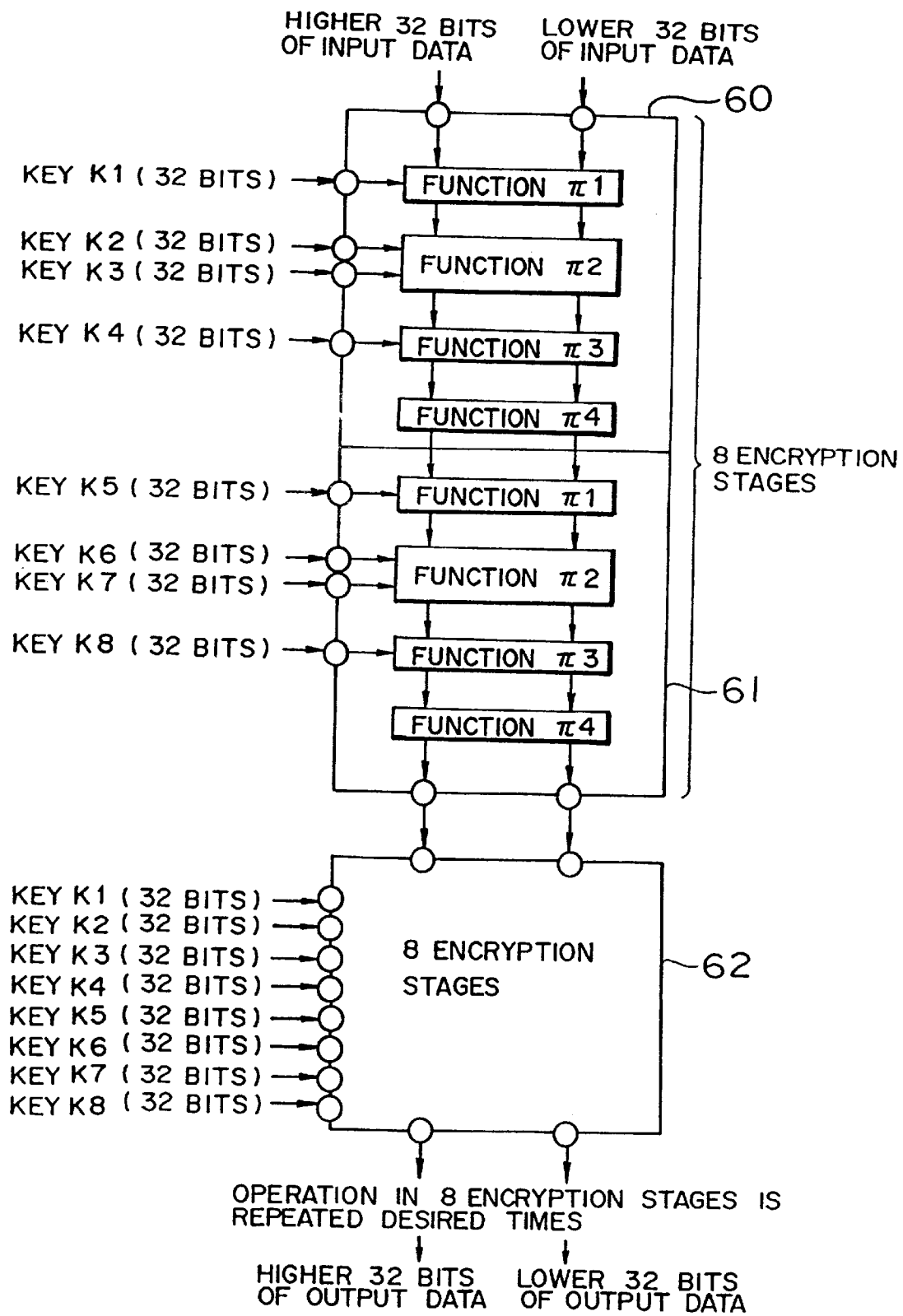
FIG. 6 is a block diagram showing an encryption algorithm used in an encryption method and an encryption apparatus of the present invention.

FIG. 6 illustrates the encryption algorithm. Input data having 64 bits is divided to the higher 32-bit data and the lower 32-bit data, and input to the first eight encryption stages including four calculation stages 60 and four calculation stages 61. Different functions are used in the four calculation stages 60 and 61.

At the first stage of the four calculation stages 60, function $\pi 1$ is applied to the input higher 32-bit data and the input lower 32-bit data. Next at the second stage, function $\pi 2$ is applied to the outputs of the first stages. In this case, a 32-bit work key K1 is input to the second stage and the second-stage calculation is performed with this work key K1.

At the third stage, function $\pi 3$ is applied to the outputs of the second stage. Two 32-bit work keys K2 and K3 are input to the third stage. The third-stage calculation is performed with the work keys K2 and K3. Next at the fourth stage, function $\pi 4$ is applied to the outputs of the third stage. A 32-bit work key K4 is input to the fourth stage and the fourth-stage calculation is performed with the work key K4.

At the first stage of the next four calculation stages 61, function $\pi 1$ is applied to the outputs of the calculation stages 60. Then, at the second stage, function $\pi 2$ is applied to the outputs of the first stage. A 32-bit work key K5 is input to the second stage and the second-stage calculation is performed with the work key K5.

At the third stage, function $\pi 3$ is applied to the outputs of the second stage. Two 32-bit work keys K6 and K7 are input to the third stage. The third-stage calculation is performed with the work keys K6 and K7. Next at the fourth stage, function $\pi 4$ is applied to the outputs of the third stage. A 32-bit work key K8 is input to the fourth stage and the fourth-stage calculation is performed with the work key K8.

As described above, the 256-bit work key is divided into eight 32-bit keys K1 to K8, and supplied to the calculation stages. The 64-bit data including the encrypted higher 32-bit data and the encrypted lower 32-bit data is input to the next eight encryption stages 62. In this eight encryption stages, the same calculations as those performed in the above-described eight encryption stages are performed and a 64-bit further-randomized output data having the higher 32 bits and lower 32 bits is obtained.

As shown in the figure, the operation in eight encryption stages can be repeated the desired times, not limited to twice. The more times the operation is repeated, the further the output data is randomized and the higher encryption strength the output data has.

Each function performed at each stage in calculation stages specifies substitution, in which a character is replaced with another one according to a certain rule, and transposition, in which the order of characters is changed.

Figure 7:
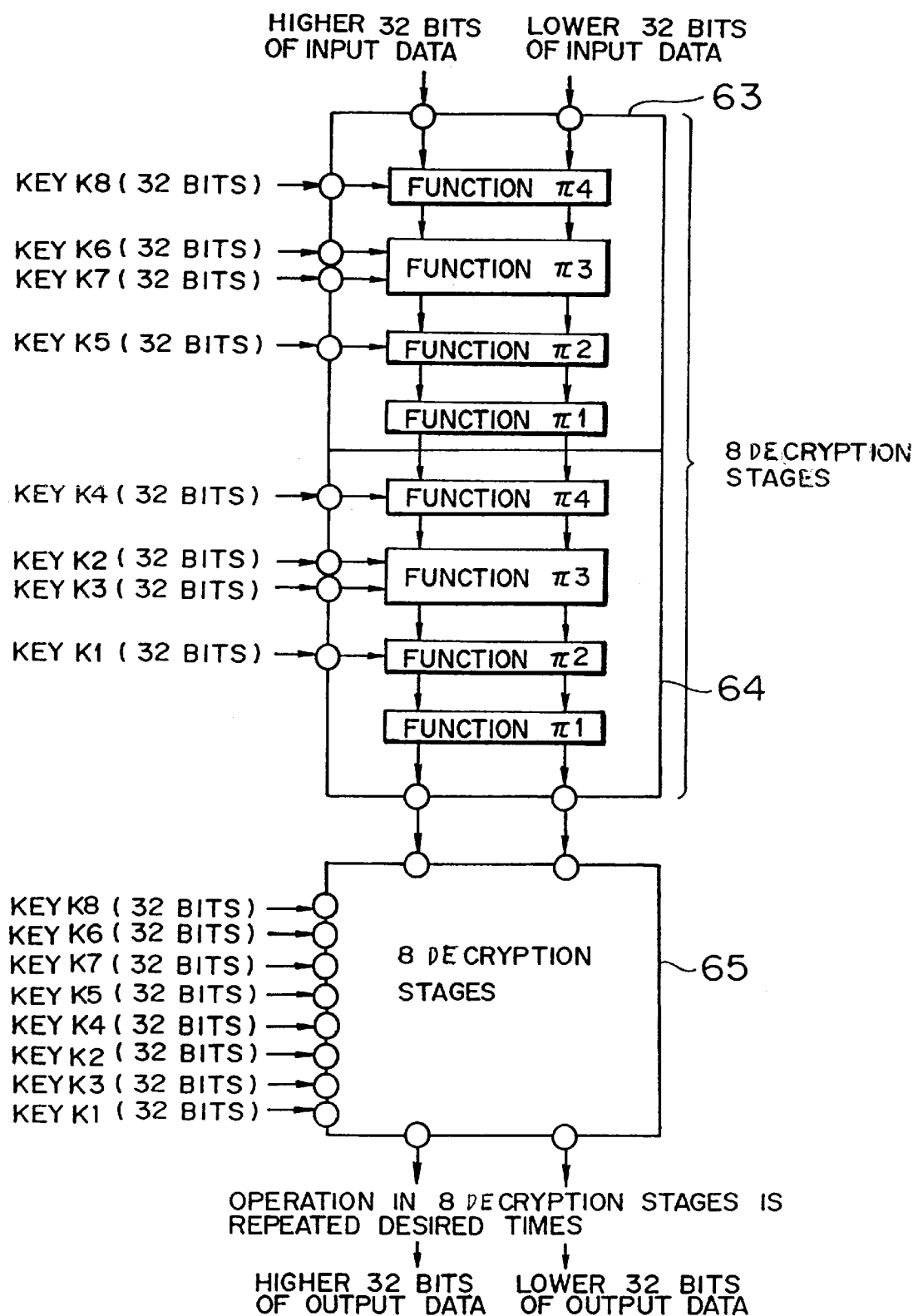
FIG. 7 is a block diagram showing a decryption algorithm used in a decryption method and a decryption apparatus of the present invention..

FIG. 7 shows the decryption algorithm, in which the calculations specified in the above-described encryption algorithm are performed in the reverse order from the output side. In other words, at the first stage of the first four calculation stages 63 in an eight decryption stages, function $\pi 4$ is applied with the use of the 32-bit work key K8 to a 64-bit encrypted input data divided into higher 32-bit data and lower 32-bit data. Next, at the second stage, function $\pi 3$ is applied to the output data of the first stage, with the use of the work keys K7 and K6. Then, at the third stage, function $\pi 2$ is applied to the output data of the second stage, with the use of the work key K5. Function $\pi 1$ is applied to the output data of the third stage in the fourth stage.

Such four calculations are performed in the same way with the use of the work keys K4 to K1 in the next four calculation stages 64.

The same operations are performed in eight decryption stages 65 which are cascade-connected to the above-described eight decryption stages. The decrypted 64-bit output data having the higher 32 bits and the lower 32 bits is obtained. The number of times the operation in eight decryption stages is repeated is set equal to the number of times the operation is repeated in the encryption algorithm.

Figure 8:
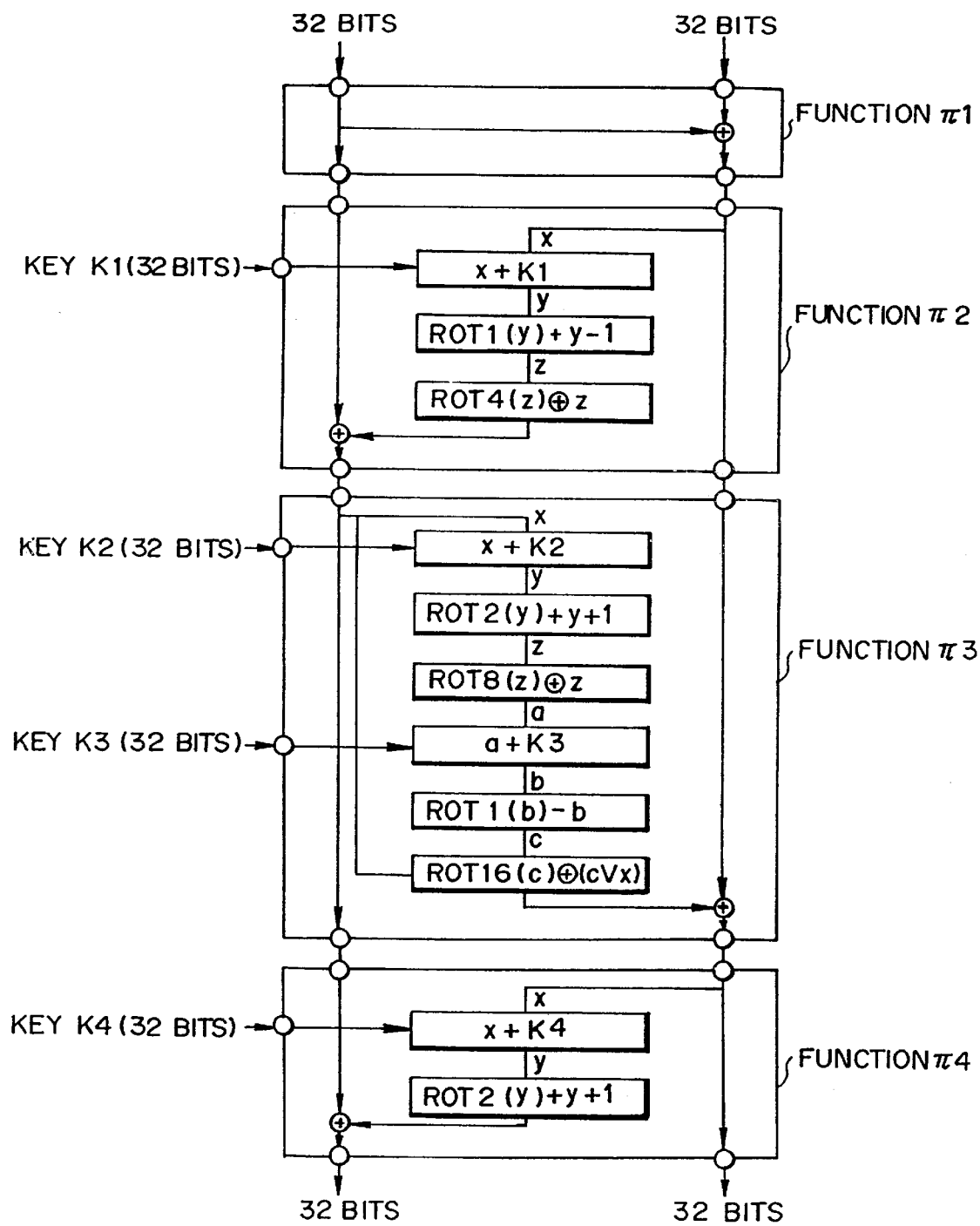
FIG. 8 shows details of basic functions used in the encryption algorithm shown in FIG. 6.

Details of at calculation performed in a calculation stage will be described below by referring to FIG. 8 with the calculation stages 60 in the encryption algorithm being taken as an example.

In the first calculation stage with function $\pi 1$, the divided-to-32-bit:, higher, input data is output as is without calculation whereas the lower data is exclusive ORed with the higher data for each bit and output as the lower data.

Next in the second calculation stage with function $\pi 2$, the work key K1 is added to the lower 32-bit data "x" with a modulo of $2^{32}$ to generate x+K1. The result x+K1, which is represented by "y" hereinafter, is cyclic left shifted by one bit and y−1 calculated with a modulo of $2^{32}$ is added to the result to get "z." "z" is cyclic left shifted by four bits and exclusive ORed with "z" for each bit. The calculation result is exclusive ORed with the higher 32-bit data and output as the higher output data. The lower 32-bit data is output as is without any calculation.

In the third calculation stage with function $\pi 3$, the work key K2 is added to the higher 32-bit data "x" with a modulo of $2^{32}$ to generate x+K2. The result x+K2, which is represented by "y" hereinafter, is cyclic left shifted by two bits and y+1 calculated with a, modulo of $2^{32}$ is added to the result to get "z." "z" is cyclic left shifted by eight bits and exclusive ORed with "z" for each bit to obtain the result "a."

The work key K3 is added to "a" with a modulo of $2^{32}$ to generate a+K3. The result a+K3, which is represented by "b" hereinafter, is cyclic left shifted by one bit and −b is added to the result with a modulo of $2^{32}$ to get "c." "c" is cyclic left shifted by 16 bits and exclusive ORed with the logical OR of "a" and "x" for each bit. The calculation result is exclusive ORed with the lower 32-bit data for each bit and output as the lower 32-bit data. The higher 32-bit data is output as is without any calculation.

In the fourth calculation stage with function $\pi 4$, the work key K4 is added to the lower 32-bit data "x" with a modulo of $2^{32}$ to generate x+K4. The result x+K4, which is represented by "y" hereinafter, is cyclic left shifted by two bits and y+1 calculated with a modulo of $2^{32}$ is added to the result. The calculation result is exclusive ORed with the higher 32-bit data and output as the higher 32-bit data. The lower 32-bit data is output as is without any calculation.

In the above calculations, substitution, in which a character is replaced with another one, is performed by adding the work keys K1 to K4 to the data, and transposition, in which the order of characters is changed, is conducted by cyclic shifting the data. A plain text is randomized and encrypted by executing such a substitution and transposition algorithm.

In decryption, the substitution and transposition algorithm reverse to that for encryption is performed and the original plain text is obtained.

The above-described operation will be further described below in detail by referring to FIG. 9 with function $\pi 2$ being taken as an example.

Figure 9:
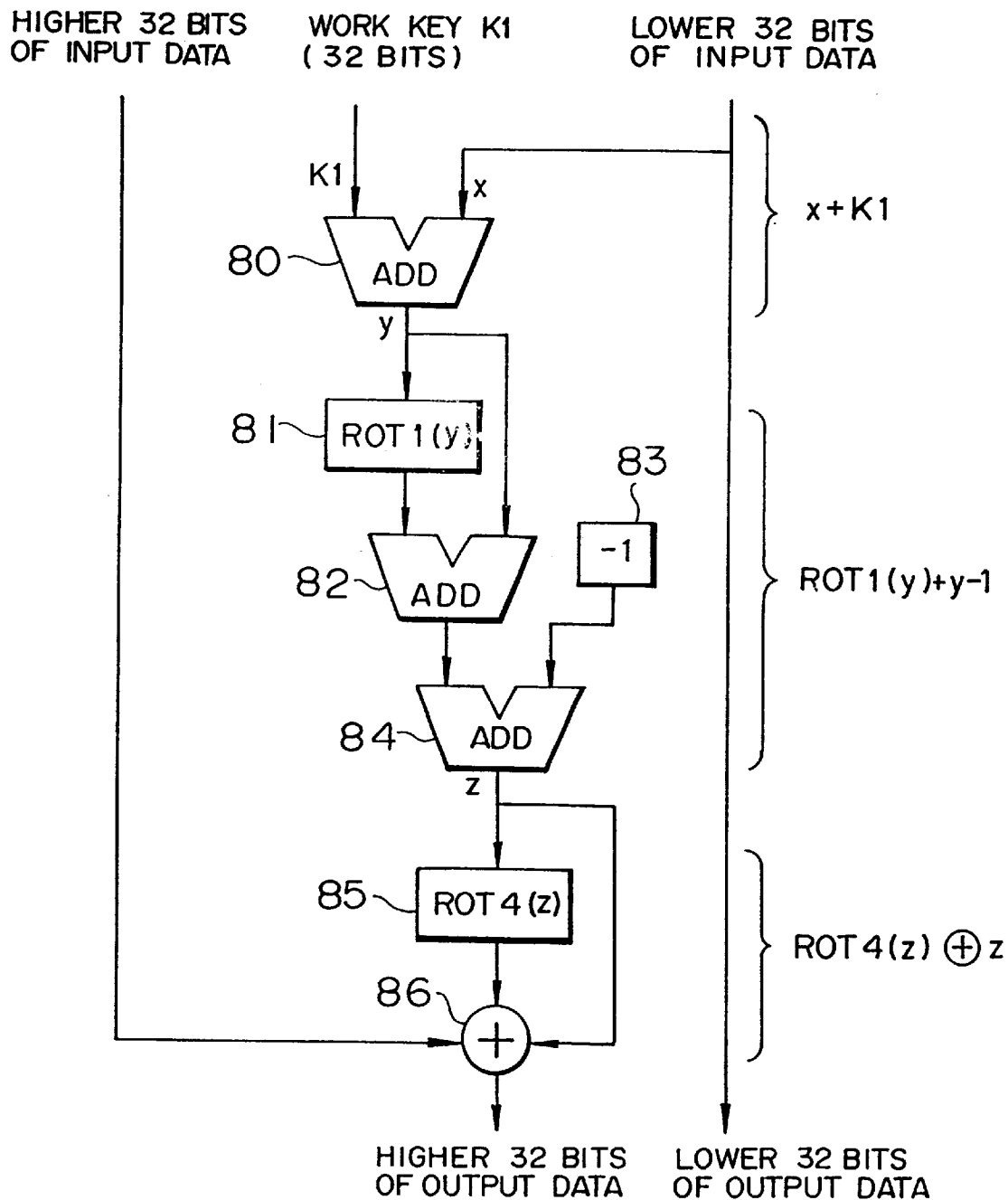
FIG. 9 is a block diagram showing details of a configuration used for calculating function n2 among the basic functions shown in FIG. 8.

In FIG. 9, the input, lower 32-bit data "x" and the 32-bit work key K1 are added in a first 32-bit adder 80 and the addition data "y" is output. The addition data "y" is cyclic left shifted by one bit in a first cyclic left shifter 81 and is also added to the output of the first cyclic left shifter 81 in a second 32-bit adder 82. In a third 32-bit adder 84, −1 is added to the addition result to obtain the data "z." The data "z" is cyclic left shifted by four bits in a second cyclic left shifter 85 and is also input to a logical exclusive OR circuit 86. The output data of the second cyclic left shifter 85, the data "z", and the higher 32-bit data are input to the logical exclusive OR circuit 86 and are exclusive ORed for each bit.

The calculation result of the logical exclusive OR circuit 86 is input to the next stage as the higher 32-bit data. The lower 32-bit data is input to the next stage as is without any calculation.

Figure 10:
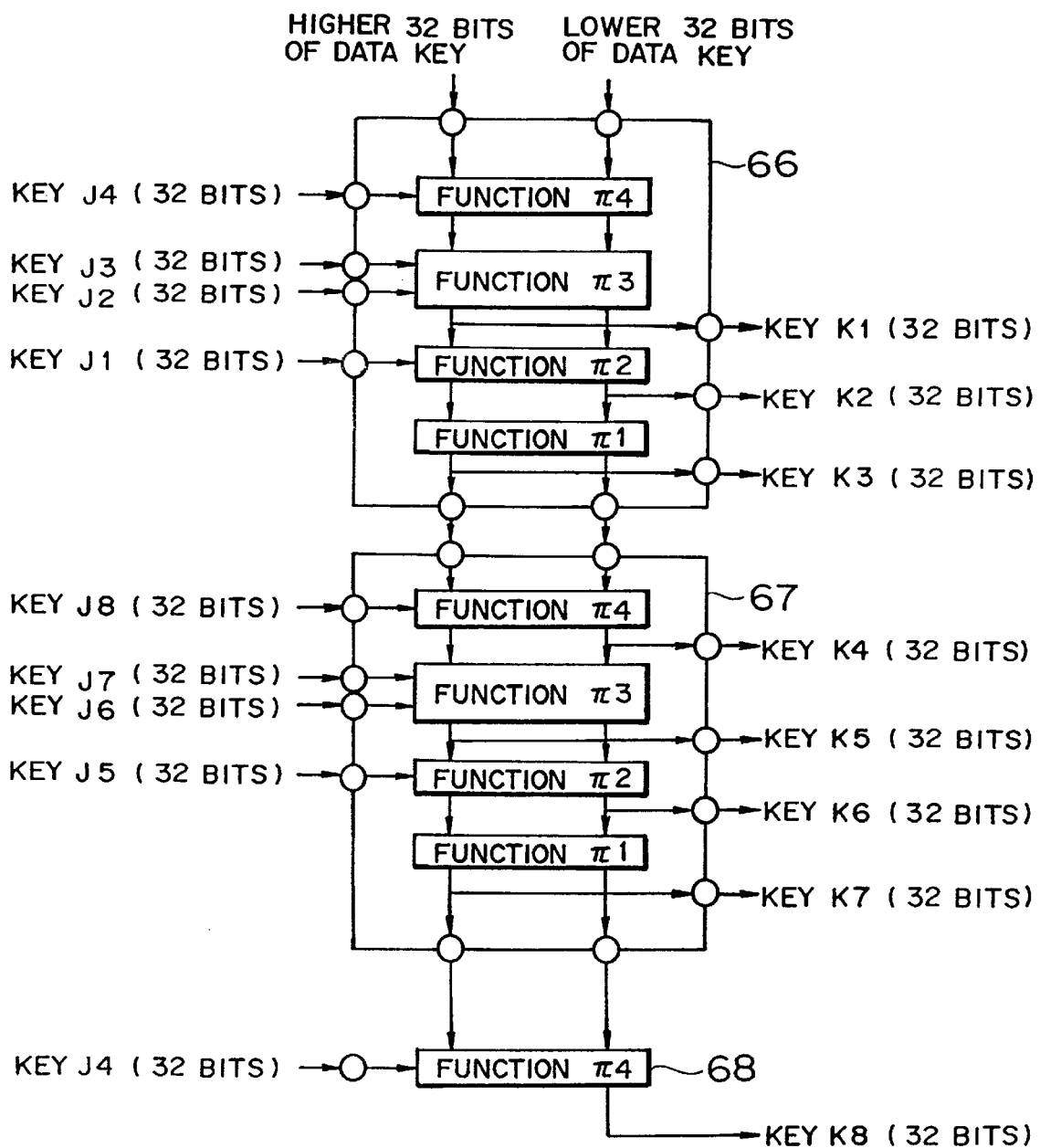
FIG. 10 is a block diagram showing a key-schedule processing algorithm of the present invention.

FIG. 10 shows an algorithm of the key-schedule processing for generating a 256-bit work key from a 64-bit data key and a 256-bit system key.

As shown in FIG. 10, two sets of four calculation stages 66 and 67, and one calculation stage 68 are cascade-connected in the key-schedule processing algorithm.

In other words, at the first stage of the first four calculation stages 66, function $\pi 4$ is applied to a 64-bit data key divided into the higher 32 bits and lower 32 bits, with the use of a 32-bit system key J4. Next, at the second stage, function $\pi 3$ is applied to the output data of the first stage, with the use of system keys J3 and J2, and the higher 32-bit data is output as a work key K1. Then, at the third stage, function $\pi 2$ is applied to the output data of the second stage, with the use of a system key J1, and the lower 32-bit data is output as a work key K2. Function $\pi 1$ is applied to the output data of the third stage in the fourth stage, and the higher 32-bit data is output as a work key K3.

At the first stage of the next four calculation stages 67, function $\pi 4$ is applied to the output data of the calculation stages 66, with the use of a 32-bit system key J8, and the lower 32-bit data is output as a work key K4. Next, at the second stage, function $\pi 3$ is applied to the output data of the first stage, with the use of system keys J7 and J6, and the higher 32-bit data is output as a work key K5. Then, at the third stage, function $\pi 2$ is applied to the output data of the second stage, with the use of a system key J5, and the lower 32-bit data is output as a work key K6. Function $\pi 1$ is applied to the output data of the third stage in the fourth stage, and the higher 32-bit data is output as a work key K7.

In the following calculation stage 68, function $\pi 4$ is applied to the output data of the calculation stages 67, with the use of a 32-bit system key J4, and the lower 32-bit data is output as a work key K8.

Figure 11B:
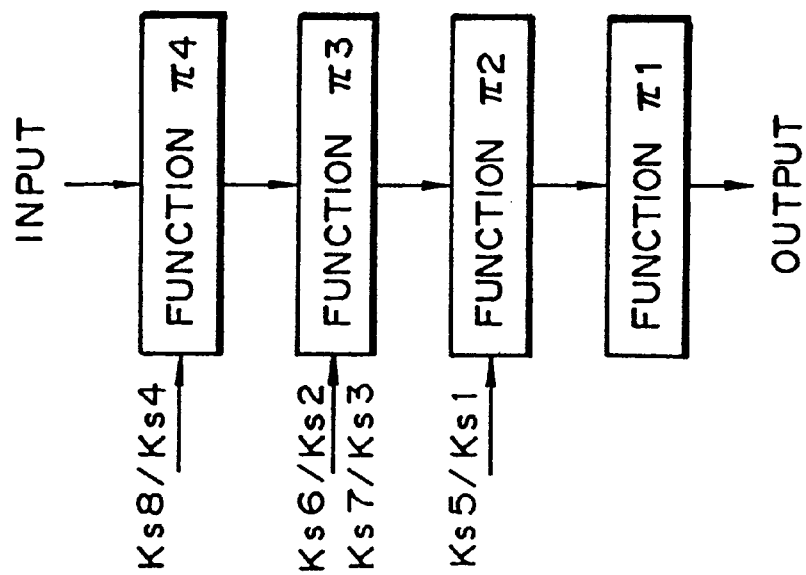
FIG. 11A shows an encryptor core and FIG. 11B illustrates a decryptor core.
Figure 11A:
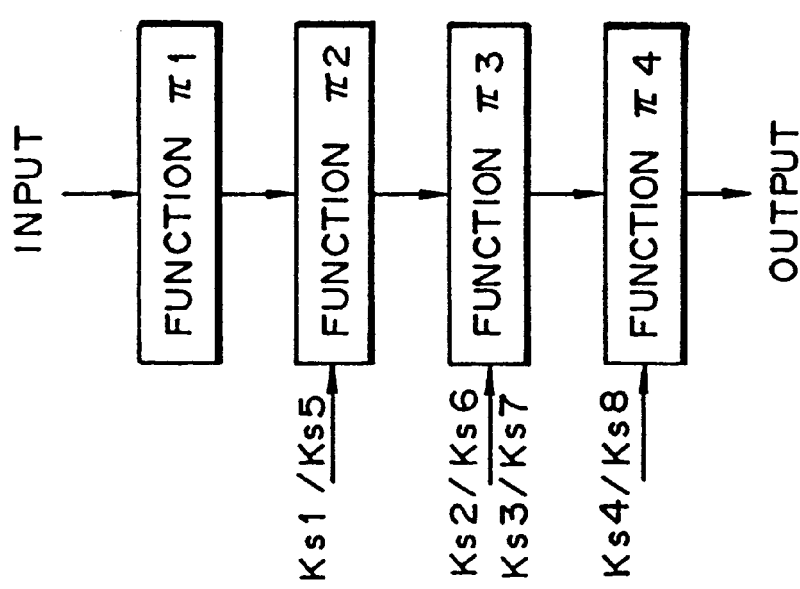
Figure 12:
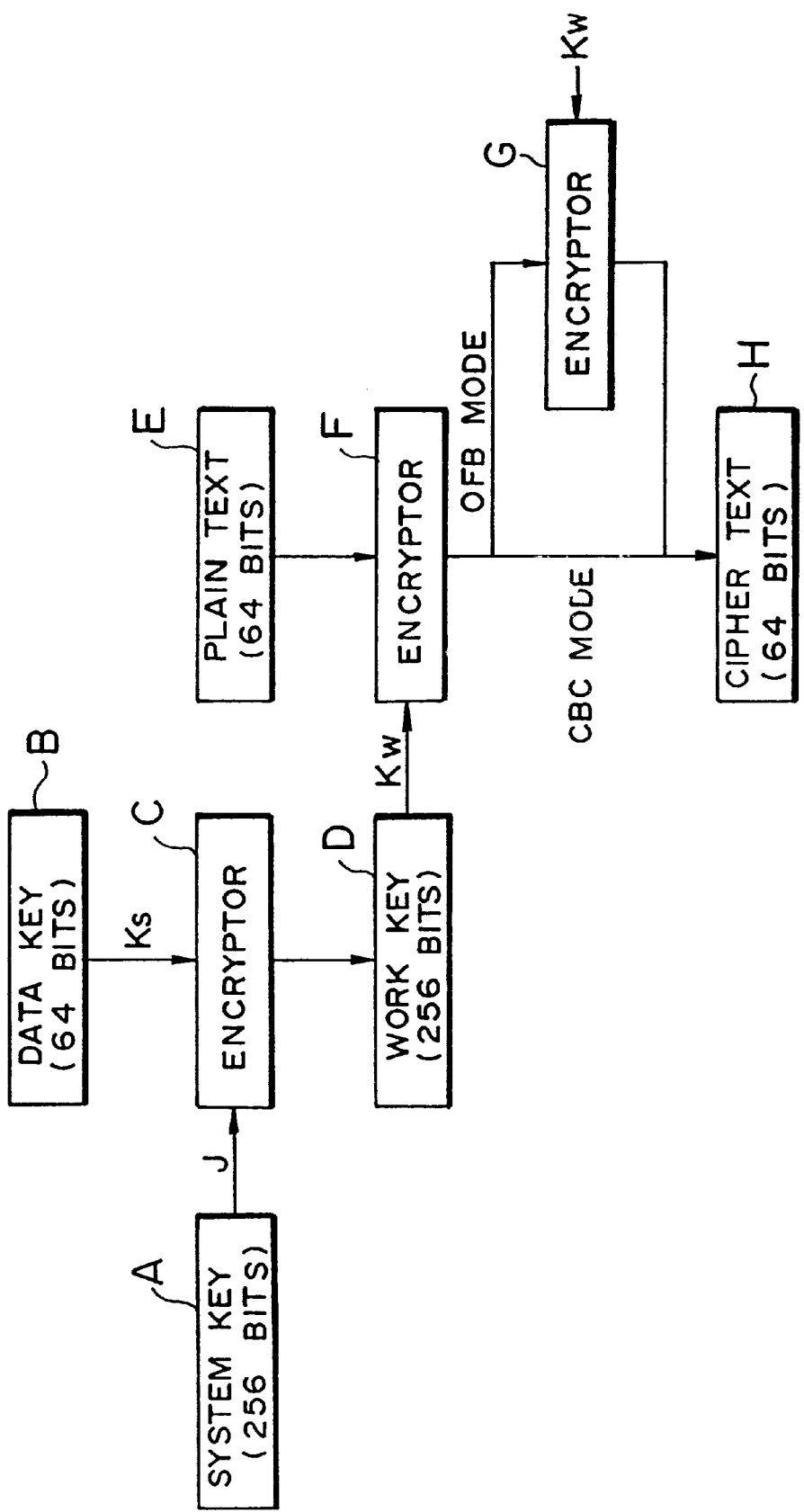
FIG. 12 shows a conventional encryption algorithm.
Figure 13:
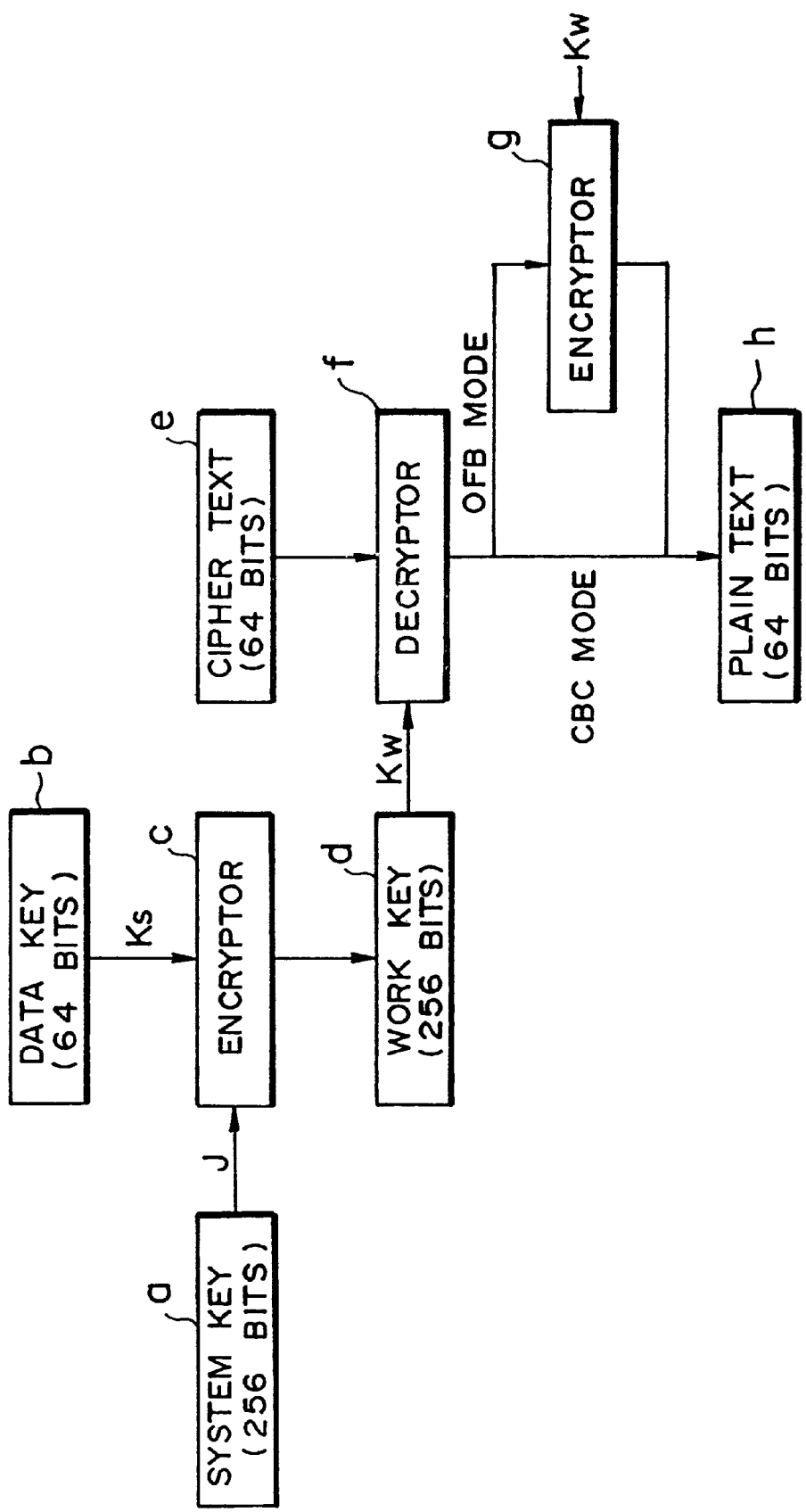
FIG. 13 shows a conventional decryption algorithm.
Figure 14A:
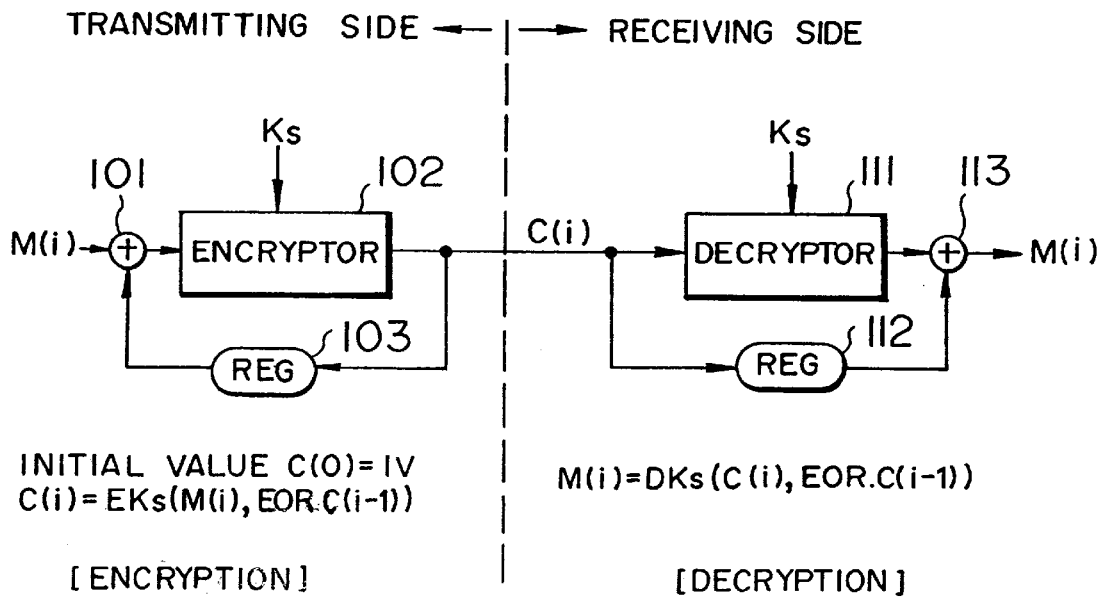
FIG. 14A shows a configuration used in an encryption-use mode, CBC mode.
Figure 14B:
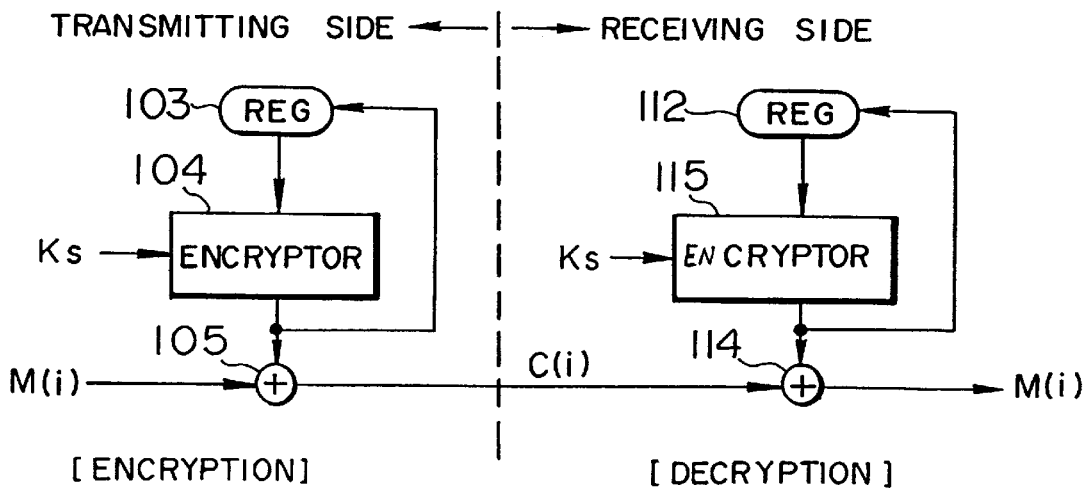
FIG. 14B illustrates a configuration used in an encryption-use mode, OFB mode.
Figure 15:
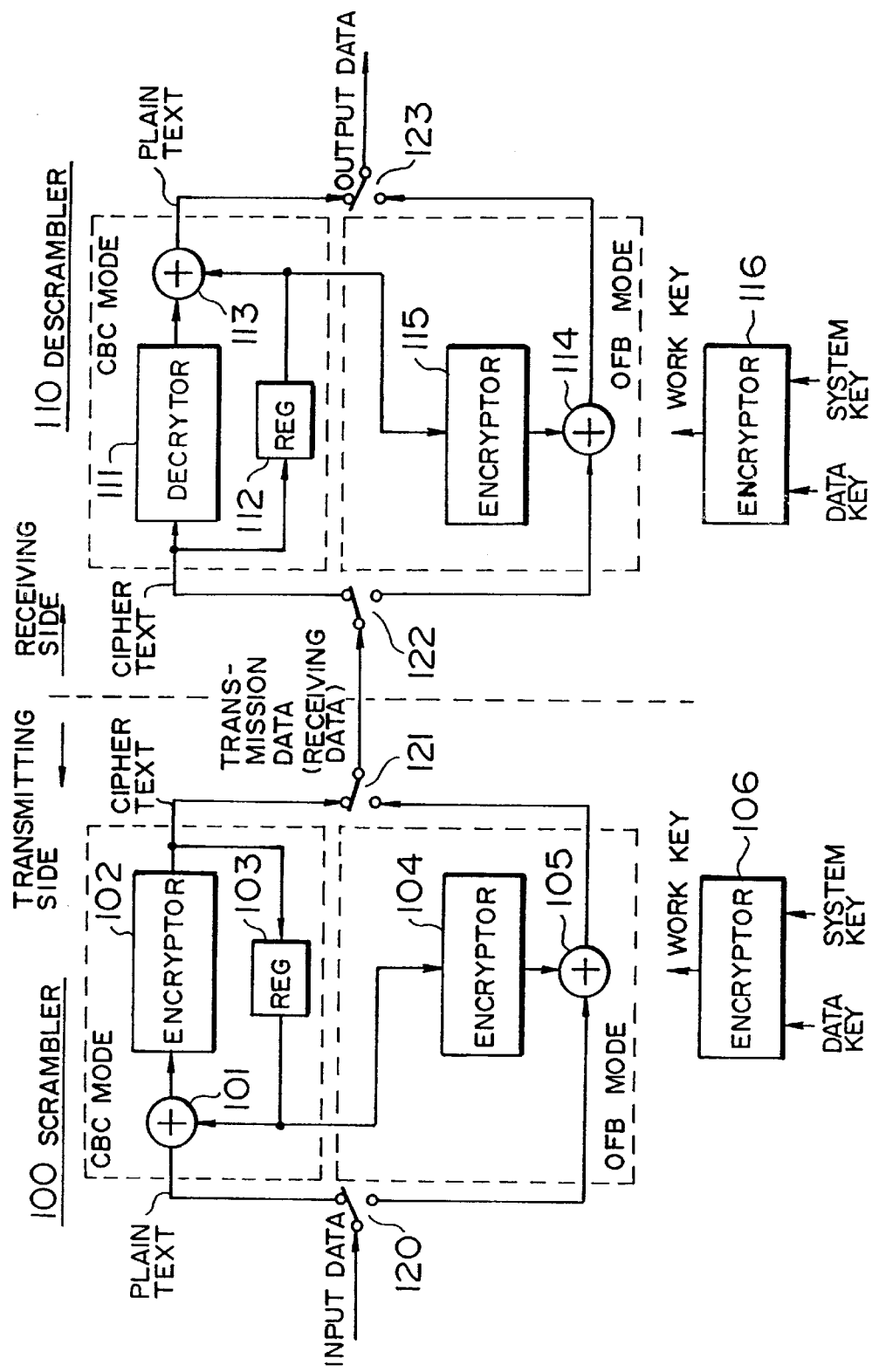
FIG. 15 shows a configuration of a conventional encryption/decryption system.

An encryptor executing the above-described encryption algorithm executes repeatedly the basic part of the encryption algorithm as shown in FIG. 6. When the four calculation stages shown in FIG. 6 are regarded as an encryptor core, the encryption algorithm for the encryptor can be implemented by using the encryptor core repeatedly as shown in FIG. 11A. Work keys Ks1 to Ks4 are input to the encryptor core first, and work keys Ks5 to Ks8 are supplied in the second time.

An decryptor executing the above-described decryption algorithm executes repeatedly the basic part of the decryption algorithm as shown in FIG. 7. When the four calculation stages shown in FIG. 7 are regarded as an decryptor core, the decryption algorithm for the decryptor can be implemented by using the decryptor core four times as shown in FIG. 11B. Work keys Ks8 to Ks5 are input to the decryptor core first, and work keys Ks4 to Ks1 are supplied in the second time.

By repeating the operation of the decryptor core two and one-fourth times, the key-schedule processing algorithm shown in FIG. 10 can be implemented. In this case, system keys are input instead of work keys, and data keys are also supplied.

As described above, the encryption algorithm is executed only with the encryptor core, and the decryption algorithm and the key-schedule processing algorithm are executed just with the decryptor core. Therefore, the hardware scale can be reduced. It is highly advantageous especially in the descrambler.

When a descrambler to which the present invention is applied is used in a receiver in a broadcasting system, since the cost of the receiver can be reduced, wide spread of the broadcasting system, which requires each user to have the receiver including the descrambler, is promoted.

In the above description, a 64-bit blocked plain text is encrypted with the use of a 64-bit data key and 256-bit system keys to generate a 64-bit blocked cipher text, and a 64-bit blocked cipher text is decrypted with the use of a 64-bit data key and 256-bit system keys to regenerate the original plain text. The present invention is not limited to texts and keys having these bits, and can be applied to text and keys having any number of bits.

Furthermore, the present invention is not limited to the encryption/decryption method repeating transposition and substitution as described above, and can be applied to other encryption/decryption methods.

The present invention can be applied to cable TV systems, satellite communication systems, and other network systems. By allowing the user to obtain system keys and data keys by transferring them in communication data or by means of prepaid cards or telephones, these systems can be configured such that only users who have paid the fee can decrypt transferred information.

What is claimed is:

1. A decryption method for decrypting data on a decryption side, said data composed of encrypted block data and encrypted fractional data that were transmitted in a predetermined packet format from an encryption side, said method comprising:

generating a work key used for decryption by executing a predetermined decryption algorithm without using an encryption algorithm, said decryption algorithm being the same decryption algorithm used on the encryption side to both generate said work key and to encrypt said fractional data using said work key, wherein said decryption algorithm performs a different sequence of operations than that of an encryption algorithm used to encrypt said block data on the encryption side using said work key;

dividing each transmitted packet into a plurality of blocks, each block having a predetermined fixed data length;

decrypting, in a first decrypting mode, said each block according to said predetermined decryption algorithm using the generated work key; and decrypting, in a second decrypting mode, said fractional data, which cannot be divided in said step of dividing and which has a data length less than one block, according to said predetermined decryption algorithm using the generated work key.

2. The decryption method according to claim 1, wherein said work key is generated from a data key and a system key by executing said predetermined decryption algorithm.

3. The decryption method according to claim 2, wherein said packet is a transport stream packet.

4. The decryption method according to claim 3, wherein a calculation is performed between a previously transmitted block which is delayed and said block decrypted according to said predetermined decryption algorithm.

5. The decryption method according to claim 4, wherein said fractional data is calculated with a random number which is generated by executing said predetermined decryption algorithm.

6. The decryption method according to claim 1 wherein:

the sequence of operations of said encryption algorithm is the ordered sequence of function $\pi 1$, function $\pi 2$, function $\pi 3$ and function $\pi 4$; and the sequence of operations of said decryption algorithm is the ordered sequence of function $\pi 4$, function $\pi 3$, function $\pi 2$ and function $\pi 1$.

7. Decryption apparatus for decrypting data on a decryption side, said data composed of encrypted block data and encrypted fractional data that were transmitted in a predetermined packet format from an encryption side, comprising:

means for generating a work key used for decryption by executing a predetermined decryption algorithm without using an encryption algorithm, said decryption algorithm being the same decryption algorithm used on the encryption side to both generate said work key and to encrypt said fractional data, wherein said decryption algorithm performs a different sequence of operations than that of an encryption algorithm used to encrypt said block data on the encryption side using said work key;

means for dividing each transmitted packet into a plurality of blocks, each block having a predetermined fixed data length;

means for decrypting, in a first decrypting mode, said each block according to said predetermined decryption algorithm using the generated work key; and means for decrypting, in a second decrypting mode, said fractional data, which cannot be divided by said means for dividing and which has a data length less than one block, according to said predetermined decryption algorithm using the generated work key.

8. The decryption apparatus according to claim 7, wherein said work key is generated from a data key and a system key by executing said predetermined decryption algorithm.

9. The decryption apparatus according to claim 8, wherein said packet is a transport stream packet.

10. The decryption apparatus according to claim 9, wherein a calculation is performed between previously transmitted block which is delayed and said block decrypted according to said predetermined decryption algorithm.

11. The decryption apparatus according to claim 10, wherein said fractional data is calculated with a random number which is generated by executing said predetermined decryption algorithm.

12. The decryption apparatus according to claim 7 wherein:

the sequence of operations of said encryption algorithm is the ordered sequence of function $\pi 1$, function $\pi 2$, function $\pi 3$ and function $\pi 4$; and the sequence of operations of said decryption algorithm is the ordered sequence of function $\pi 4$, function $\pi 3$, function $\pi 2$ and function $\pi 1$.

13. An encryption method for encrypting data to be transmitted in a predetermined packet format, comprising:

generating a work key by executing a predetermined decryption algorithm;

dividing each packet to be transmitted into a plurality of blocks, each block having a predetermined fixed data length;

encrypting, in a first encrypting mode, said each block according to a predetermined encryption algorithm using the generated work key, wherein said encryption algorithm performs a different sequence of operations than that of said decryption algorithm; and encrypting, in a second decrypting mode, fractional data, which cannot be divided in said dividing step and which has a length less than one block, according to said predetermined decryption algorithm using the generated work key.

14. The encryption method according to claim 13, wherein said work key is generated from a data key and a system key by executing said predetermined decryption algorithm.

15. The encryption method according to claim 14, wherein said packet is the transport stream packet.

16. The encryption method according to claim 15, wherein a calculation result between said block to be encrypted and previously encrypted block which is delayed is encrypted according to said predetermined encryption algorithm.

17. The encryption method according to claim 16, wherein said fractional data is calculated with a random number which is generated by executing said predetermined decryption algorithm.

18. The encryption method according to claim 13 wherein:

the sequence of operations of said encryption algorithm is the ordered sequence of function $\pi 1$, function $\pi 2$, function $\pi 3$ and function $\pi 4$; and the sequence of operations of said decryption algorithm is the ordered sequence of function $\pi 4$, function $\pi 3$, function $\pi 2$ and function $\pi 1$.

19. Encryption apparatus for encrypting data to be transmitted in a predetermined packet format, comprising:

means for generating a work key by executing a predetermined decryption algorithm;

means for dividing each packet to be transmitted into a plurality of blocks, each block having a predetermined fixed data length;

means for encrypting, in a first encrypting mode, said each block according to a predetermined encryption algorithm using the generated work key, wherein said encryption algorithm performs a different sequence of operations than that of said decryption algorithm; and means for encrypting, in a second encrypting mode, fractional data, which cannot be divided by said means for dividing and which has a length less than one block, according to said predetermined decryption algorithm using the generated work key.

20. The encryption apparatus according to claim 19, wherein said work key is generated from a data key and a system key by executing said predetermined decryption algorithm.

21. The encryption apparatus according to claim 20, wherein said packet is the transport stream packet.

22. The encryption apparatus according to claim 21, wherein a calculation result between said block to be encrypted and previously encrypted block which is delayed is encrypted according to said predetermined encryption algorithm.

23. The encryption apparatus according to claim 22, wherein said fractional data is calculated with a random number which is generated by executing said predetermined decryption algorithm.

24. The encryption apparatus according to claim 19 wherein:
- the sequence of operations of said encryption algorithm is the ordered sequence of function $\pi 1$, function $\pi 2$, function $\pi 3$ and function $\pi 4$; and
- the sequence of operations of said decryption algorithm is the ordered sequence of function $\pi 4$, function $\pi 3$, function $\pi 2$ and function $\pi 1$.

* * * * *